(12) United States Patent
Mercer et al.

(10) Patent No.: US 10,101,487 B2
(45) Date of Patent: Oct. 16, 2018

(54) TRANSMITTER WITH LOCATING SIGNAL FREQUENCY PHASE SHIFT BASED ON SWITCHABLE CABLE COUPLING

(71) Applicant: Merlin Technology Inc., Kent, WA (US)

(72) Inventors: John E. Mercer, Gig Harbor, WA (US); Albert W. Chau, Woodinville, WA (US)

(73) Assignee: Merlin Technology Inc., Kent, WA (US)

( * ) Notice: Subject to any disclaimer, the term of this patent is extended or adjusted under 35 U.S.C. 154(b) by 0 days.

(21) Appl. No.: 15/785,986

(22) Filed: Oct. 17, 2017

(65) Prior Publication Data
US 2018/0038982 A1 Feb. 8, 2018

Related U.S. Application Data

(63) Continuation of application No. 15/130,840, filed on Apr. 15, 2016, now Pat. No. 9,804,287, which is a (Continued)

(51) Int. Cl.
*G01V 3/08* (2006.01)
*G01V 3/165* (2006.01)
(Continued)

(52) U.S. Cl.
CPC ............... *G01V 3/08* (2013.01); *G01V 3/12* (2013.01); *G01V 3/165* (2013.01); *G01V 3/17* (2013.01)

(58) Field of Classification Search
CPC ... G01V 3/08; G01V 3/12; G01V 3/17; G01V 3/165
(Continued)

(56) References Cited

U.S. PATENT DOCUMENTS 3,991,363 A 11/1976 Lathrop
4,387,340 A 6/1983 Peterman
(Continued)

FOREIGN PATENT DOCUMENTS

EP 1217391 6/2001

*Primary Examiner* — Jay Patidar
(74) *Attorney, Agent, or Firm* — Pritzkau Patent Group, LLC

(57) ABSTRACT

A transmitter is part of a cable locating system for use in a region which contains at least first and second in-ground cables such that, when the first cable is driven at a locating signal frequency to emit a locating signal, the locating signal is coupled to the second cable to cause the second cable to generate a false locating signal. A frequency generator produces the locating signal frequency for coupling onto the first cable and a reference signal, which includes the locating signal frequency, such that the reference signal includes a modulation envelope for distinguishing the locating signal from the false locating signal. A switch selectively couples the locating signal frequency to the first cable in a selected coupling configuration such that the locating signal is subject to a coupling phase shift that varies based on the coupling configuration. A phase shifter phase shifts the locating signal frequency responsive to the selected coupling configuration such that the locating signal frequency at least approximately matches the phase of the locating signal to compensate for the coupling phase shift.

11 Claims, 6 Drawing Sheets

Related U.S. Application Data continuation of application No. 14/231,603, filed on Mar. 31, 2014, now Pat. No. 9,335,431, which is a continuation of application No. 13/301,487, filed on Nov. 21, 2011, now Pat. No. 8,698,501, which is a continuation of application No. 12/979,793, filed on Dec. 28, 2010, now Pat. No. 8,080,998, which is a continuation of application No. 12/512,853, filed on Jul. 30, 2009, now Pat. No. 7,884,610, which is a continuation of application No. 12/137,424, filed on Jun. 11, 2008, now Pat. No. 7,586,308, which is a continuation of application No. 11/557,432, filed on Nov. 7, 2006, now Pat. No. 7,397,249, which is a continuation of application No. 11/105,804, filed on Apr. 13, 2005, now Pat. No. 7,151,375.

(51) Int. Cl.
    *G01V 3/12* (2006.01)
    *G01V 3/17* (2006.01)

(58) Field of Classification Search
    USPC .................................................. 324/326–329
    See application file for complete search history.

(56) References Cited

U.S. PATENT DOCUMENTS

| | | | |
|---|---|---|---|
| 4,639,674 A | 1/1987 | Rippingale | |
| 4,775,832 A | 10/1988 | Pecukonis | |
| 4,818,944 A | 4/1989 | Rippingale | |
| 5,093,622 A | 3/1992 | Balkman | |
| 5,194,812 A | 3/1993 | Yokoi | |
| 5,260,659 A | 11/1993 | Flowerdew et al. | |
| 5,361,029 A | 11/1994 | Rider et al. | |
| 5,418,447 A | 5/1995 | Beha et al. | |
| 5,471,143 A | 11/1995 | Doany | |
| 5,644,237 A | 7/1997 | Eslambolchi et al. | |
| 5,754,049 A | 5/1998 | Howell | |
| 5,767,678 A * | 6/1998 | Mercer | E21B 47/02216 175/45 |
| 5,798,644 A | 8/1998 | Eslambolchi et al. | |
| 6,005,532 A | 12/1999 | Ng | |
| 6,014,026 A | 1/2000 | Mercer | |
| 6,127,827 A | 10/2000 | Lewis | |
| 6,163,144 A | 12/2000 | Steber et al. | |
| 6,166,532 A | 12/2000 | Coia et al. | |
| 6,215,888 B1 | 4/2001 | Eslambolchi et al. | |
| 6,232,780 B1 | 5/2001 | Mercer | |
| 6,353,320 B1 | 3/2002 | Eslambolchi et al. | |
| 6,407,550 B1 | 6/2002 | Parakulam et al. | |
| 6,411,073 B1 | 6/2002 | Fischer et al. | |
| 6,496,008 B1 | 12/2002 | Brune et al. | |
| 6,529,006 B1 | 3/2003 | Hayes | |
| 6,549,011 B2 | 4/2003 | Flatt | |
| 6,737,867 B2 | 5/2004 | Brune et al. | |
| 6,756,783 B2 | 6/2004 | Brune | |
| 7,057,383 B2 | 6/2006 | Schlapp et al. | |
| 7,062,414 B2 | 6/2006 | Waite et al. | |
| 7,151,375 B2 | 12/2006 | Mercer et al. | |
| 7,397,249 B2 | 7/2008 | Mercer et al. | |
| 7,586,308 B2 | 9/2009 | Mercer et al. | |
| 7,884,610 B2 | 2/2011 | Mercer et al. | |
| 8,080,998 B2 | 12/2011 | Mercer et al. | |
| 8,698,501 B2 | 4/2014 | Mercer et al. | |
| 9,335,431 B2 | 5/2016 | Mercer et al. | |
| 2001/0017545 A1 * | 8/2001 | Mercer | E21B 44/00 324/326 |
| 2003/0058961 A1 | 3/2003 | Fling et al. | |

\* cited by examiner

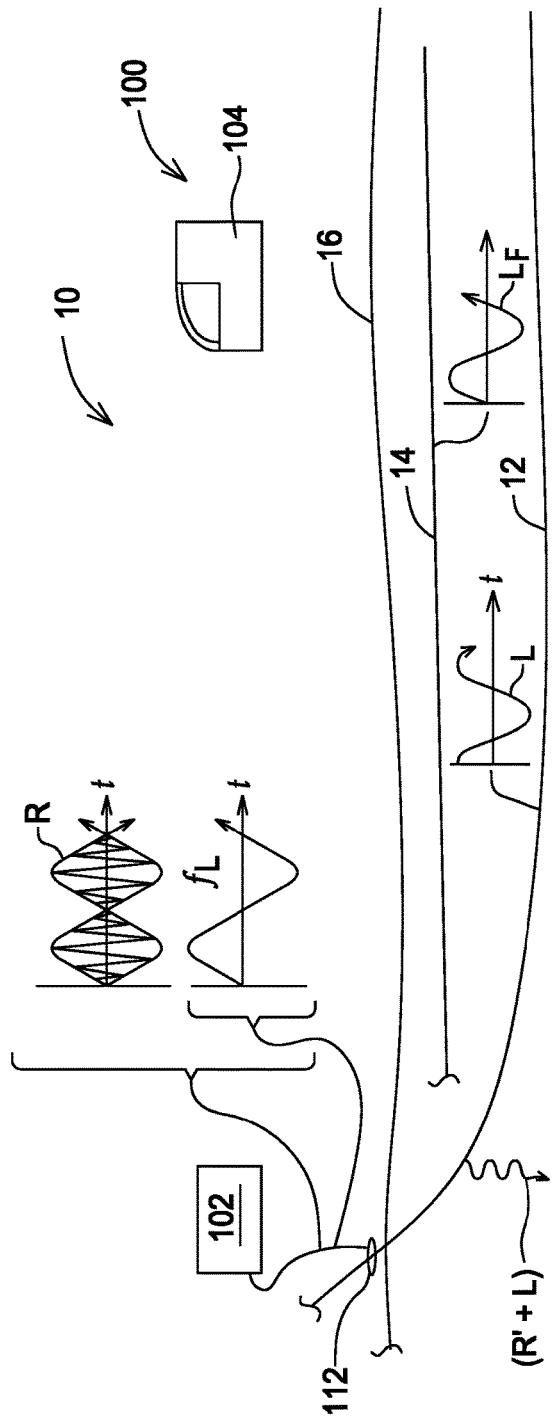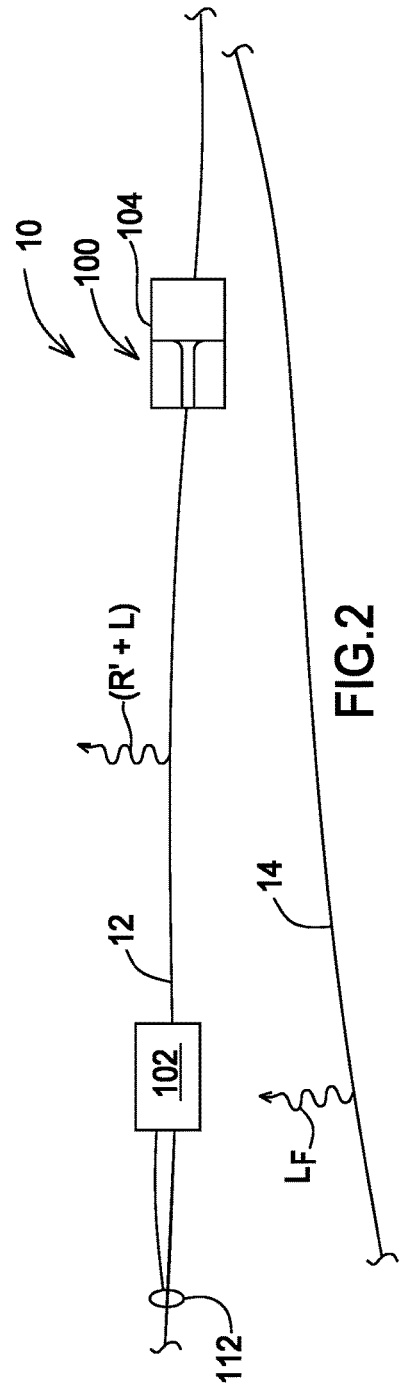
FIG.1
FIG.2

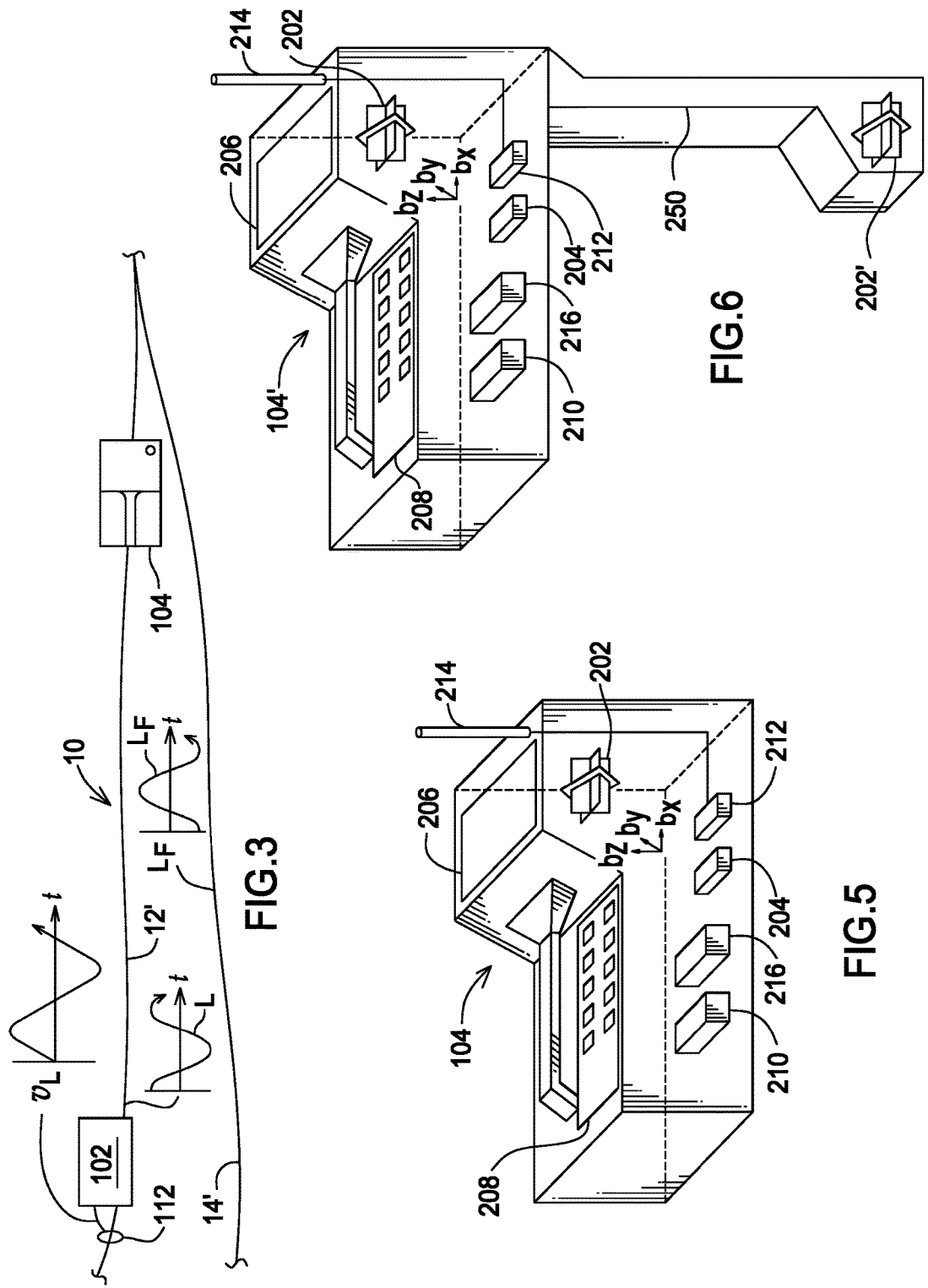

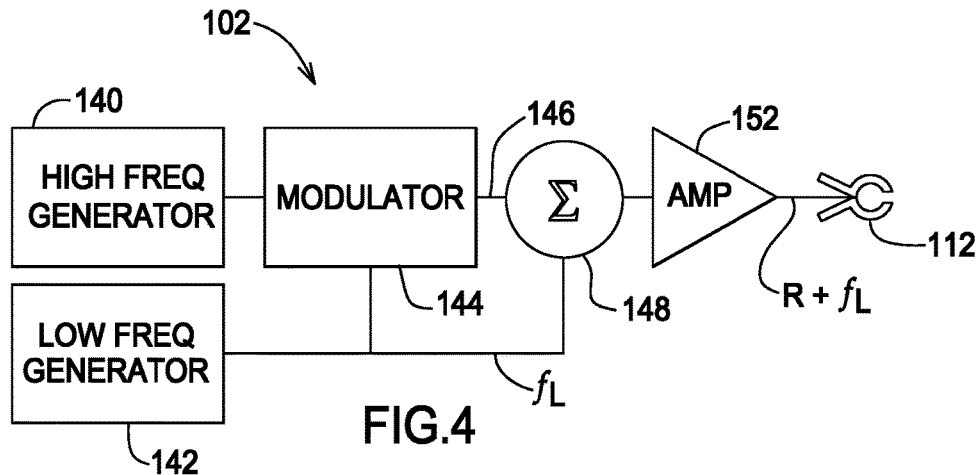
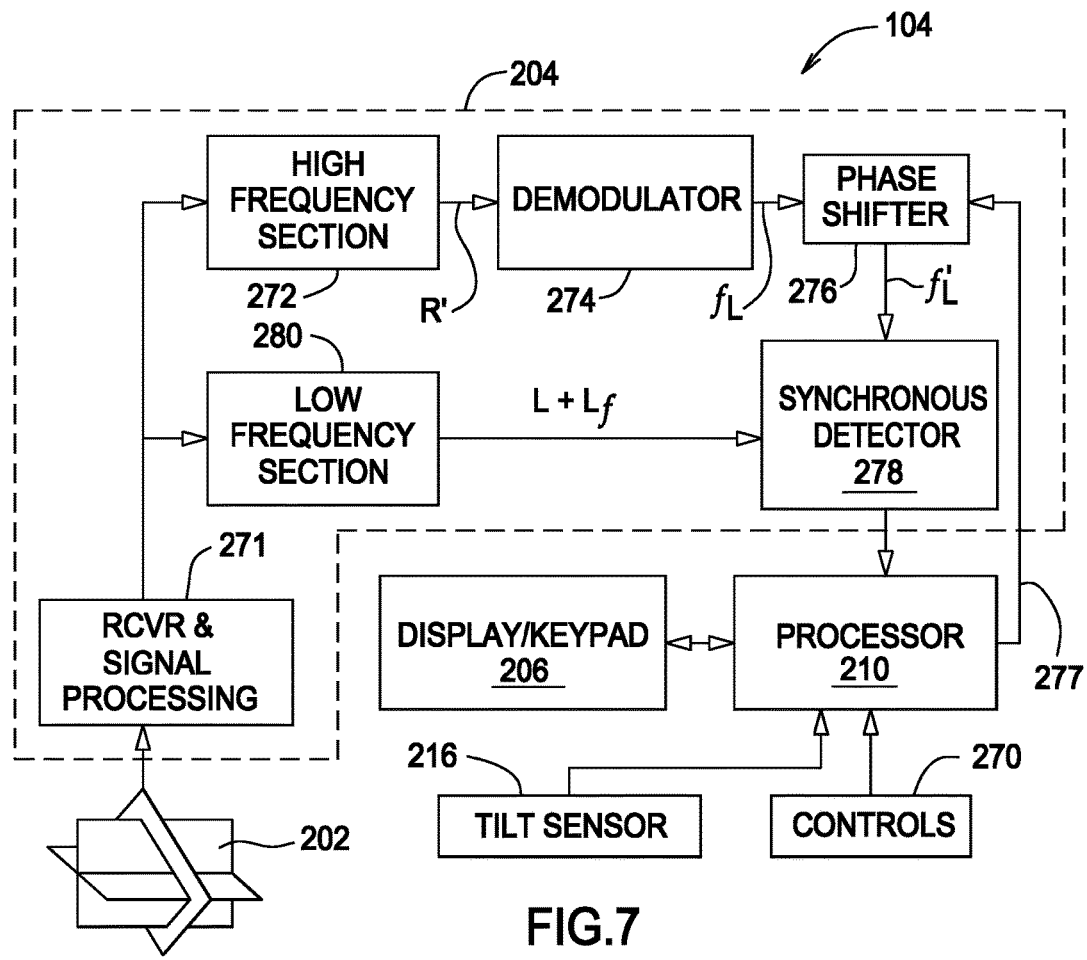

TRANSMITTER WITH LOCATING SIGNAL FREQUENCY PHASE SHIFT BASED ON SWITCHABLE CABLE COUPLING

RELATED APPLICATIONS

The present application is a continuation application of co-pending U.S. patent application Ser. No. 15/130,840 filed on Apr. 15, 2016; which is a continuation of U.S. patent application Ser. No. 14/231,603 filed on Mar. 31, 2014 and issued as U.S. Pat. No. 9,335,431 on May 10, 2016; which is a continuation of U.S. patent application Ser. No. 13/301,487 filed on Nov. 21, 2011 and issued as U.S. Pat. No. 8,698,501 on Apr. 15, 2014; which is a continuation of U.S. patent application Ser. No. 12/979,793 filed on Dec. 28, 2010 and issued as U.S. Pat. No. 8,080,998 on Dec. 20, 2011; which is a continuation of U.S. patent application Ser. No. 12/512,853 filed on Jul. 30, 2009 and issued as U.S. Pat. No. 7,884,610 on Feb. 8, 2011; which is a continuation of U.S. patent application Ser. No. 12/137,424 filed on Jun. 11, 2008 and issued as U.S. Pat. No. 7,586,308 on Sep. 8, 2009; which is a continuation of U.S. patent application Ser. No. 11/557,432, filed on Nov. 7, 2006 and issued as U.S. Pat. No. 7,397,249 on Jul. 8, 2008; which is a continuation application of U.S. patent application Ser. No. 11/105,804, filed on Apr. 13, 2005, and issued as U.S. Pat. No. 7,151,375 on Dec. 19, 2006; the disclosures of which are incorporated herein by reference.

BACKGROUND OF THE INVENTION

The present invention relates generally to a system and method for locating buried lines such as, for example, pipes, cables, conduits or other conductors and, more particularly, to a locating arrangement that is configured for distinguishing "false" cable locating signals.

The installation of utility lines underground is increasingly popular for reasons of aesthetics and for practical reasons such as, for example, protecting these lines from the effects of severe above ground weather conditions. In areas where buried lines have previously been installed, however, it is often necessary to locate the position of the lines. This task is generally accomplished by causing the line to emit an electromagnetic locating signal by connecting a transmitter arrangement to an electrically conductive component of the line. It is noted that such an electrically conductive component may be provided specifically for this purpose such as, for example, a tracer wire as part of a fiber optic cable. Once the location of the cable or cables in a region has been identified, subsequent operations such as excavation in the region may be performed in a way that avoids pre-existing cable locations. Of course, sufficient locating accuracy is a necessity.

Unfortunately, the prior art has been limited by at least one aspect of the aforedescribed technique. Specifically, the electromagnetic signal that is transmitted from a particular cable of interest can be coupled to another cable in the region. This coupling can take place through the ground or can occur when the cables are in physical contact, for example, at their distal ends whereby a direct, resistance-type electrical connection is formed between the cables. Once the locating signal is coupled to another cable, that cable will re-emit the locating signal. Using prior art systems, the re-emitted locating signal is, in most cases, indistinguishable from the original locating signal. When faced with this situation, it is not uncommon for an operator of an above ground locator to follow a cable that is re-emitting the locating signal, with no indication that a different cable is, in fact, being located. Thus, a considerable amount of confusion is possible when more than one cable is present in the operating region.

The present invention resolves the foregoing limitations in a highly advantageous way, while providing still further advantages, as will be described immediately hereinafter.

SUMMARY OF THE DISCLOSURE

In a region which includes at least first and second in-ground cables extending across the region, each of which cable includes an electrically conductive component such that, when the first cable is driven at a locating signal frequency to emit a locating signal in an electromagnetic form, the locating signal is coupled to the second cable in a way which causes the second cable to generate a false locating signal in electromagnetic form, a system and method are described for discriminating between the locating signal and the false locating signal. In one aspect of the invention, a reference signal, which contains the locating signal frequency impressed thereon, is transmitted in a way which provides for detection of a phase shift between the locating signal and the false locating signal. Based on the phase shift, a receiver is used to distinguish the locating signal from the false locating signal.

In another aspect of the invention, the locating signal is electromagnetically coupled from the first cable to the second cable through the ground to cause the second cable to emit the false locating signal. The locating signal frequency is recovered from the reference signal. Synchronous detection of the locating signal frequency and a selected frequency band, which includes said locating signal and said false locating signal, is performed in a way which substantially rejects the false locating signal while providing an output responsive to the locating signal.

BRIEF DESCRIPTIONS OF THE DRAWINGS

The present invention may be understood by reference to the following detailed description taken in conjunction with the drawings briefly described below.

FIG. 1 is a diagrammatic elevational view of a region in which the cable locating system and method of the present invention are operating including two cables disposed in the region, one of which transmits the locating signal of interest and the other of which transmits a false, potentially interfering signal.

FIG. 2 is a diagrammatic plan view of the region of FIG. 1 including the cables disposed therein along with the system of the present invention.

FIG. 3 is a diagrammatic plan view of the region in which the cable locating system and method of the present invention are operating including two cables that are resistively connected at distal ends thereof.

FIG. 4 is a block diagram which illustrates one embodiment of a transmitter produced in accordance with the present invention.

FIG. 5 is a diagrammatic see-through view, in perspective, which illustrates one embodiment of a locator/receiver that is produced in accordance with the present invention.

FIG. 6 is a diagrammatic see-through view, in perspective, which illustrates another embodiment of a locator/receiver of the present invention including a dependent wand which houses an additional antenna arrangement.

FIG. 7 is a block diagram which illustrates one embodiment of a receiver that may be used in a portable locator in accordance with the present invention.

DETAILED DESCRIPTION

Figure 8:
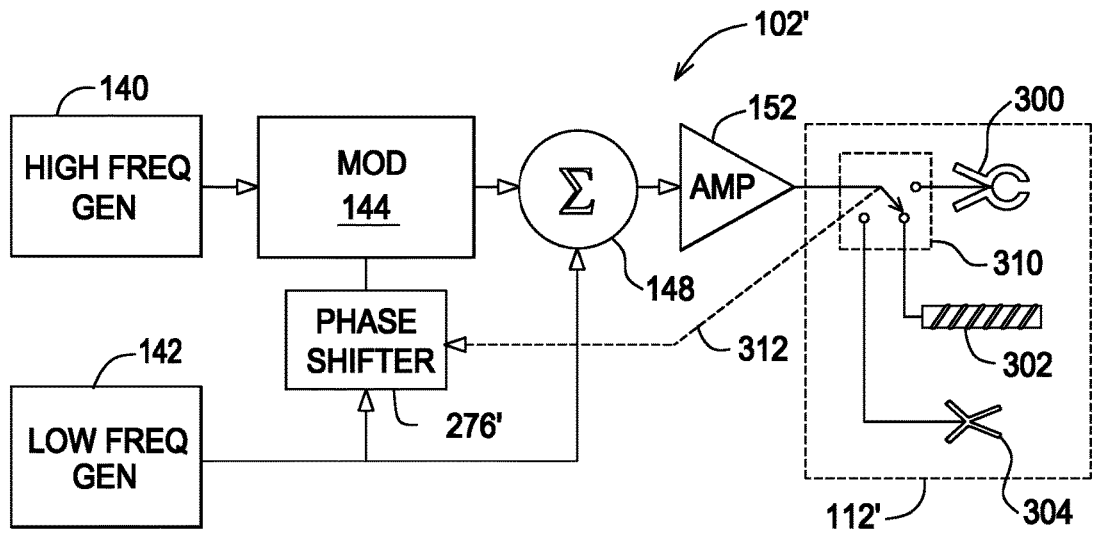
FIG. 8 is a block diagram which illustrates another embodiment of a transmitter, produced in accordance with the present invention, including selective cable locating signal connection capabilities.

The following description is presented to enable one of ordinary skill in the art to make and use the invention and is provided in the context of a patent application and its requirements. Various modifications to the described embodiments will be readily apparent to those skilled in the art and the generic principles herein may be applied to other embodiments. Thus, the present invention is not intended to be limited to the embodiment shown but is to be accorded the widest scope consistent with the principles and features described herein including alternatives, modifications and equivalents, as defined within the scope of the appended claims. It is noted that the drawings are not to scale and are diagrammatic in nature in a way that is thought to best illustrate features of interest. Further, like reference numbers are applied to like components, whenever practical, throughout the present disclosure. Descriptive terminology such as, for example, upper/lower, right/left, front/rear may be employed for purposes of enhancing the reader's understanding, with respect to the various views provided in the figures, and is in no way intended as being limiting.

Turning now to the drawings, attention is immediately directed to FIG. 1 in which a locating region is generally indicated by the reference number 10 and shown in a diagrammatic elevational view. Region 10 includes a first cable 12 and a second cable 14, each of which includes an electrically conductive component which may be used for purposes of transmitting an electromagnetic locating signal, as will be further described. The surface of the ground is indicated by reference number 16.

Referring to FIG. 2 in conjunction with FIG. 1, the former is a diagrammatic plan view of region 10. The ground is illustrated as being transparent with the exception of its surface 16 in FIG. 1. The highly advantageous cable locating system of the present invention is illustrated in each of FIGS. 1 and 2, generally indicated by the reference number 100. System 100 includes a transmitter 102 and a receiver/locator 104, as will be described in detail at appropriate points hereinafter. For the moment, however, it is sufficient to note that transmitter 102 generates a locating signal frequency $f_L$ and a reference signal R, and includes any suitable coupling configuration 112 for coupling the locating signal frequency or the locating frequency in combination with the reference signal onto cable 12. This coupling can be accomplished using inductive coupling or a direct electrical connection, both of which are considered as familiar to one having ordinary skill in the art. It is noted that exemplary waveforms have been illustrated in FIG. 1 with respect to $f_L$ and R as well as other physical quantities of interest, as will be further described.

Having coupled the locating signal frequency and the reference signal onto cable 12, this cable emanates a locating signal which is designated as L and a signal R' which designates the reference signal subject to the phase shift of coupling configuration 112. It should be appreciated that the same phase difference is introduced between locating signal frequency $f_L$ and locating signal L. The specific magnitude of the phase shift depends upon the specific type of arrangement that is used to couple the locating signal frequency to the cable. In the present illustrations, the use of inductive coupling is contemplated wherein locating signal L leads locating signal frequency $f_L$ by approximately 90°. For reasons which will be made evident below, an awareness of the phase characteristics of coupling configuration 112 is generally needed.

As described above with respect to the prior art, locating signal L travels through the ground and can be coupled to cable 14. Of course, the degree of coupling is dependent upon various factors such as, for example, proximity and resistive path from one cable to the other. A detailed discussion of these factors, however, is not necessary to an understanding of the present invention and is therefore considered to be beyond the scope of the present description. What is important to understand is that cable 14, under many circumstances, produces a reemitted or "false" locating signal $L_F$. If this reemitted locating signal is viewed solely in terms of its frequency, it is indistinguishable from locating signal L. Hence, many operators of prior art cable locating systems may inadvertently follow cable 14, as opposed to cable 12. Moreover, during a particular locating session, the operator may inadvertently switch between these two cables, yielding an extremely confusing picture of what appears to be the actual underground configuration of the cable. It should also be appreciated that there may be any number of "secondary" cables within the region in addition to the "target" cable, although only one secondary cable has been illustrated in the present example for purposes of clarity. Each one of the secondary cables can potentially produce an interfering locating signal. The composite of all of these interfering signals can make it next to impossible to identify the target cable of interest. As will be described immediately hereinafter, the present invention sweeps aside these difficulties.

Turning to FIG. 3, a diagrammatic plan view of region 10 illustrates an alternative situation with respect to a first cable 12' and a second cable 14'. In particular, each of these cables includes a distal end and these distal ends are electrically connected to one another by a resistance connection. The latter may occur deliberately, for example, in a junction box (not shown) or through inadvertent direct contact. The specific mechanism through which the resistance connection arises has no effect on system 10 and the use of the locating technique to be described in further detail below.

Having described region 10 in detail above, attention is now directed to details with respect to the configuration of the locating system with reference to FIG. 4, which illustrates one embodiment of transmitter 102 in the form of a block diagram. Details with respect to the various functional blocks have not been provided, since it is considered that the provision of circuitry for satisfying these functions is within the capability of one having ordinary skill in the art, as is also the case with all block diagrams of the present disclosure. Transmitter 102 includes a high-frequency or carrier generator 140 which may operate at any suitable frequency in view of a contemplated locating signal frequency (as illustrated in FIG. 1). The latter is generated by a low-frequency or locating signal frequency generator 142. One useful locating signal frequency has been found to be approximately 30 kHz with a carrier generator frequency of approximately 300 kHz, although these values are not intended to be limiting. By way of example, the locating signal frequency may be in the range of approximately 1 Hz to 80 KHz while the carrier generator frequency may be in the range of approximately 10 Hz to 300 KHz. In this regard, it may be useful to maintain a value in of from 5 to 10 as a ratio of the carrier generator frequency to the locating signal frequency. In this regard, no harmonic requirement need be imposed with respect to this frequency relationship. A modulator 144 receives the carrier generator signal from carrier frequency generator 140, as well as the locating signal frequency from low frequency signal generator 142. Modulator 144 impresses the locating signal frequency onto the carrier frequency using any suitable form of modulation such as, for example, amplitude modulation or frequency modulation. An output 146 of modulator 144 comprises a modulated carrier, the appearance of which depends on the specific form of modulation that is employed, as will be familiar to those having ordinary skill in the art. This modulated output may be referred to herein as a "reference" signal for reasons which will become evident below. It is noted that the reference signal corresponds to R of FIG. 1. Output 146 is connected to a summer 148. Locating signal generator 142 also provides its output to summer 148. An output of summer 148 comprises the additive combination of the reference signal and the locating signal frequency, $R+f_L$. This combination is then supplied to an amplifier which drives coupling configuration 112. As described above, the latter may comprise an inductive clamp, an inductive arrangement (whereby the transmitter is simply positioned immediately adjacent to the cable), or a direct electrical connection.

Referring to FIGS. 1, 2 and 4, the combination of $R+f_L$ is induced on cable 12 by transmitter 102. A corresponding signal that is emanated from cable 12 is indicated as R'+L, in FIG. 1. It is noted that only a waveform corresponding to L has been shown in FIG. 1 for purposes of illustrative clarity. Further, a (') prime mark, applied to the reference signal, designates that the signal is subject to a phase shift by virtue of passing through coupling configuration 112. In the embodiment presently under discussion, it is to be understood that R' appears as essentially identical to R, as will be further discussed. With respect to L, however, it is apparent that a phase shift has occurred when compared with $f_L$. Generally, this phase shift will be approximately 90 degrees, depending upon coupling configuration 112. In the present example, L is shown as leading $f_L$. It is recognized that, while the carrier frequency of reference signal R' is shifted in the same manner as locating signal L, the modulation envelope of the reference signal is unaffected, at least from a practical standpoint. That is, the modulation envelope of phase shifted reference signal R' is essentially identical to the modulation envelope of reference signal R and the phase shift of the carrier produces only a small phase shift of the modulation envelope which would affect determinations made herein that rely on the modulation envelope. Thus, locating signal frequency $f_L$ is recoverable from R' as its modulation envelope. As will be seen, this recognition is applied in a highly advantageous manner upon reception of the various signal components.

Turning to FIG. 5, one embodiment of portable locator 104 is illustrated and configured in accordance with the present invention. Locator 104 includes a three-axis antenna cluster 202 measuring three orthogonally arranged components of magnetic flux in locator fixed coordinates. The antenna cluster could be composed of magnetometers which would be advantageous at lower frequencies. One useful antenna cluster contemplated for use herein is disclosed by U.S. Pat. No. 6,005,532 entitled ORTHOGONAL ANTENNA ARRANGEMENT AND METHOD which is commonly assigned with the present application and is incorporated herein by reference. It is noted that this antenna cluster is advantageous with respect to generating a vector sum of the local flux intensity. Antenna cluster 202 is connected to a receiver section 204, which will be described in detail at an appropriate point below. A tilt sensor arrangement (not shown) may be provided for measuring gravitational angles from which the components of flux in a level coordinate system may be determined. Locator 200 further includes a graphics display 206, a keypad 208 and a microprocessor 210 interconnected appropriately with the various components. A telemetry arrangement 212 having an antenna 214 is optional, under control of microprocessor 210, and is provided based on the specific system implementation, as will be discussed at appropriate points hereinafter. Other components may optionally be added such as, for example, an azimuth sensor in the form of a tri-axial magnetometer 216 to aid in position determination relative to a selected direction such as a cable orientation and ultrasonic transducers (not shown) for measuring the height of the locator above the surface of the ground. One highly advantageous ultrasonic transducer arrangement is described, for example, in U.S. Pat. No. 6,232,780 which is commonly assigned with the present application and is incorporated herein by reference.

Still referring to FIG. 5, antenna cluster 202 is oriented having a receiving axis arranged along an axis of symmetry of the locator. In particular, components of the received electromagnetic locating signal are designated as $b_x$, $b_y$, $b_z$ with $b_x$ being oriented along the axis of symmetry of the locator. It is noted that locator 104 is useful with respect to a wide variety of cable locating techniques. One highly advantageous cable locating technique is described in U.S. Pat. No. 6,496,008, entitled FLUX PLANE LOCATING IN AN UNDERGROUND DRILLING SYSTEM, which is commonly owned with the present application and is incorporated herein by reference. Additional highly advantageous cable locating techniques are described in U.S. Pat. No. 6,737,867 which is commonly owned with the present application and incorporated herein by reference. It should be appreciated that the teachings herein are considered to provide remarkable advantages, irrespective of the details of the specific locating technique that is employed, since virtually all of these cable locating techniques can be improved with the capability to reject unwanted interference. Moreover, as will be seen, the described technique operates in a manner which is most often transparent to the operator of locator 102.

Referring to FIG. 6, a modified locator 104' is illustrated. Locator 104' is essentially identical to locator 104 with the addition of a downwardly dependent wand 250. The latter includes a distal end which houses an additional antenna cluster 202'. Details with regard to the use of this alternative locator implementation will be provided at an appropriate point below.

Turning to FIG. 7, one embodiment of locator 104 is shown here to illustrate additional details with respect to its features. In particular, controls 270 may include items such as, for example, an operator actuatable trigger or push button switch. It is noted that this particular embodiment does not use a telemetry arrangement. Receiver section 204 includes a receiver and signal processing section 271 and a high frequency section 272, connected to section 271, having a bandpass filter that passes phase shifted reference signal R'. The high frequency section provides this output to a demodulator 274 in order to recover locating signal frequency $f_L$ from the reference signal. The locating signal frequency is then fed to a phase shifter 276. The latter is under control of processor 210 via a control line 277. Phase shifter 276 is controlled, depending upon the particular phase shift characteristics of coupling configuration 112, to provide a phase shift that is essentially equal to the phase shift that is introduced by coupling configuration 112. Hence, the output of phase shifter 276 is designated as $f'_L$ or, in other words, the locating signal frequency with a phase shift that matches the coupling configuration phase shift, so as to be in phase with the locating signal. Moreover, phase shifter 276 can additionally provide compensation for circuitry induced phase shift, if needed, to cause $f'_L$ to be in phase with the locating signal. It is noted that phase shifter 276 may not be necessary in some implementations, for example, when the locating signal and reference signal are resistively/directly coupled to the cable or associated tracer wire. Alternatively, as will be described below, another embodiment of the transmitter may include phase shift compensation.

Still referring to FIG. 7, a synchronous detector 278 includes two inputs, one of which receives shifted locating signal frequency $f'_L$. The other input of the synchronous detector is connected to a low frequency section 280, which is itself connected to antenna cluster 202 via receiver and signal processing section 271. The low frequency section thus provides a band limited output to the other input of synchronous detector 278 which contains locating signal L along with false locating signal $L_F$. Hence, the synchronous detector provides a strong output responsive to the combination of $f'_L$ and L, since these two signals are in phase, thereby essentially passing the locating signal on to processor 210. False locating signal $L_F$, on the other hand, is rejected since it is, at least approximately, 90 degrees out of phase with shifted locating signal frequency $f'_L$. That is, the quadrature component of the false locating signal can be rejected by synchronous detection. Processor 210 then uses the received relative signal strength of the locating signal according to its intended locating procedures. As mentioned above, rejection of the false locating signal is essentially transparent to an operator of the locator.

Referring briefly to FIG. 3, in this example, the resistance connection between cables 12' and 14' results in false locating signal $L_F$ being 180 degrees out of phase with respect to locating signal L, as illustrated. For this reason, if the operator switches from cable 12 to cable 14 during locating, and while at least generally maintaining the orientation of the locator, the signal strength shown on display 206 (FIG. 5) will change signs, thereby notifying the operator that he or she is no longer following cable 12'.

Turning again to FIG. 6, since antenna cluster 202 can be used to ascertain an essentially simultaneous signal strength along each of its three orthogonal receiving axes, a total field strength can be determined in the form of a vector sum. Further, antenna 202' can also be used to determine an additional total signal strength at its location, spaced apart from cluster 202. It is recognized that this configuration is particularly advantageous, since the use of both vector sums reduces orientation requirements with respect to the way in which the operator orients the locator with respect to the cable. More specifically, the vector sum will produce the same value for any orientation of the locator including parallel, perpendicular or otherwise with respect to the cable. The use of a vector sum with respect to one antenna cluster is described in U.S. Pat. No. 5,155,442, which is commonly owned with the present application and is incorporated by reference. Hence, the use of two vector sums is considered as a variation that is within the capability of one having ordinary skill in the art. In particular, the locating field over the cable is normally assumed to be a circular field with all of the horizontal projections of the fluxlines perpendicular to the cable. With two antennas, the upper and lower antennas are used to obtain a ratio of the field strengths at two elevations in order to calculate depth. This ratio is the same, whether using just a portion of the field, with equal misalignment of the antennas, or using the total field strength.

Referring to FIG. 8, another embodiment of a transmitter, that is configured in accordance with the present invention, is generally indicated by the reference number 102'. Comparison with FIG. 4 reveals that transmitter 102' is similar in structure to previously described transmitter 102. Hence, the present discussion will be limited to differences between these transmitters. One difference resides in the use of a phase shifter 276' in transmitter 102', which eliminates the need for the use of a phase shifter in a receiver which cooperates with transmitter 102'. Of course, if the receiver includes a programmable phase shifter, it can be set to introduce zero phase shift. Further, a modified coupling arrangement 112' has been provided which includes an inductive clamp 300, a coupling antenna 302 and a direct or resistive clip 304 each of which may be used selectively. In use, the inductive clamp is clamped around the cable in a well known manner; coupling antenna 302 is positioned adjacent to the cable onto which it is desired to induce a signal; and clip 304 is attached directly to the cable or tracer wire. A switching arrangement 310 is connected between amplifier 152 and each selectable coupling arrangement. In this regard, it should be appreciated that an inductive configuration, such as is provided by clamp 300 and antenna 302, will introduce a phase shift, while direct clip 304 will not. Hence, switching arrangement 310 outputs a selection signal to phase shifter 276', as indicated by a dashed line 312, in a way which causes phase shifter 276' to introduce an appropriate phase shift, based on the particular selection of coupling that is made using switch 310. It should be appreciated that the latter can be configured in a wide variety of ways in view of this overall disclosure. For example, three separate input jacks can be provided, each of which is customized for one type of coupling connection whereby connection to a particular jack produces the appropriate selection signal on line 312. As another example, a rotary or push button switch can be provided to electronically select the type of coupling that is in use.

Figure 9:
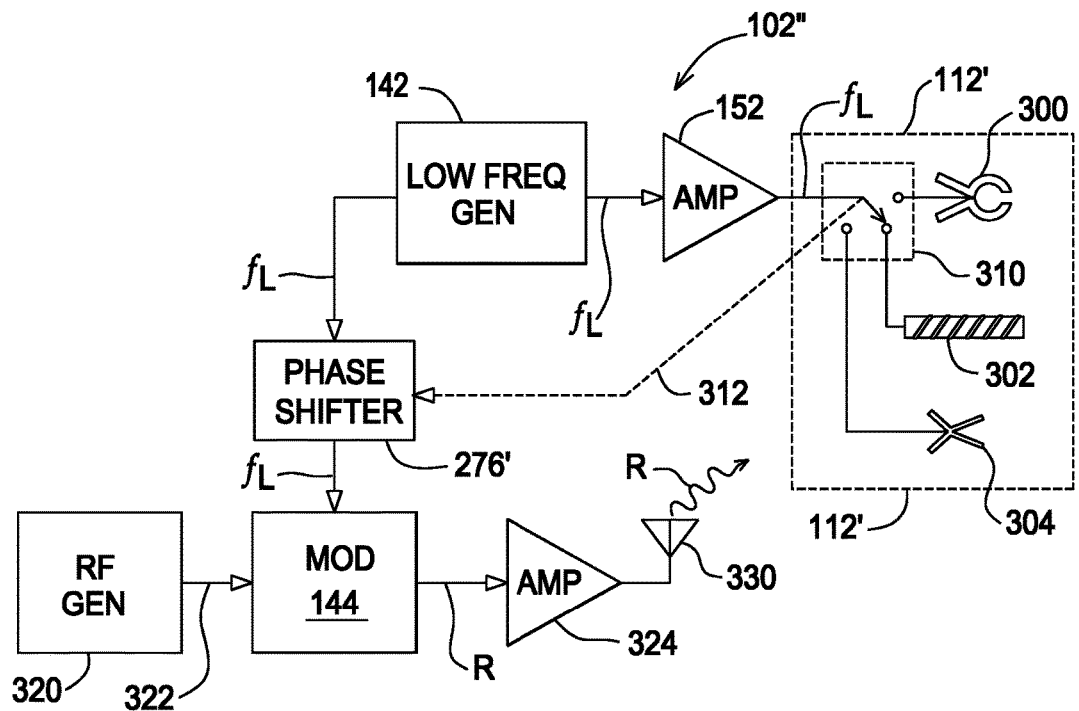
FIG. 9 is a block diagram which illustrates still another embodiment of a transmitter, produced in accordance with the present invention, that is capable of transmitting a reference signal using an RF carrier.

Attention is now directed to FIG. 9, which illustrates another embodiment of the transmitter of the present invention, generally indicated by the reference number 102". In this case, low frequency generator 142 provides locating signal frequency $f_L$ directly to amplifier 152 which remains connected to coupling configuration 112'. At the same time, the locating signal frequency is also provided to phase shifter 276', which remains responsive to switching arrangement 310, as described above. Phase shifter 276' outputs phase shifted locating signal $f'_L$ to modulator 144. Again, it should be remembered that phase shifter 276' is not required, for example, when a phase shifter is provided in a cooperating receiver.

Transmitter 102" also includes an RF generator 320 having an output 322 which provides an RF carrier to modulator 144. In this way, modulator 144 generates reference signal R of FIG. 1. The reference signal is coupled to an RF amplifier 324 which drives an RF antenna 330 so as to emanate reference signal R. As described above with respect to the reference signal, any suitable form of modulation may be utilized. In this particular embodiment, however, an RF carrier is utilized since the reference signal is transmitted through the air to a suitable receiver, yet to be described. The present transmitter may utilize any number of commercially available RF transmitters including, for example, spread spectrum 2.5 GHz systems modulated with the reference signal. The principles discussed above remain unchanged with the use of a higher frequency reference signal. While the use of commercially available RF transmitters is convenient, any suitable transmitter and/or carrier frequency may be employed. One variation resides in generating the reference signal with a stable oscillator in the receiver/locator. A cooperating transmitter then periodically transmits a synchronization signal such as, for example, a synchronization pulse to lock the internally generated reference signal of the receiver to the reference signal that is in use in the transmitter. It is noted that in any RF embodiment, repeaters can be used to increase the range of the reference signal so long as the phase of the repeated reference signal is maintained or tracked for appropriate phase shifting in the receiver. It is noted that using an RF carrier reference signal is advantageous at least for the reason that the RF reference signal, transmitted through the air, is immune to higher attenuation rates which inground reference signals may encounter, even though the carrier frequency for the inground reference signal can be significantly lower that the carrier frequency of an RF reference signal. This feature is advantageous with respect to long cables wherein an inground reference signal may become too weak to use, while the locating signal, being at a significantly lower frequency, remains strong.

Figure 10:
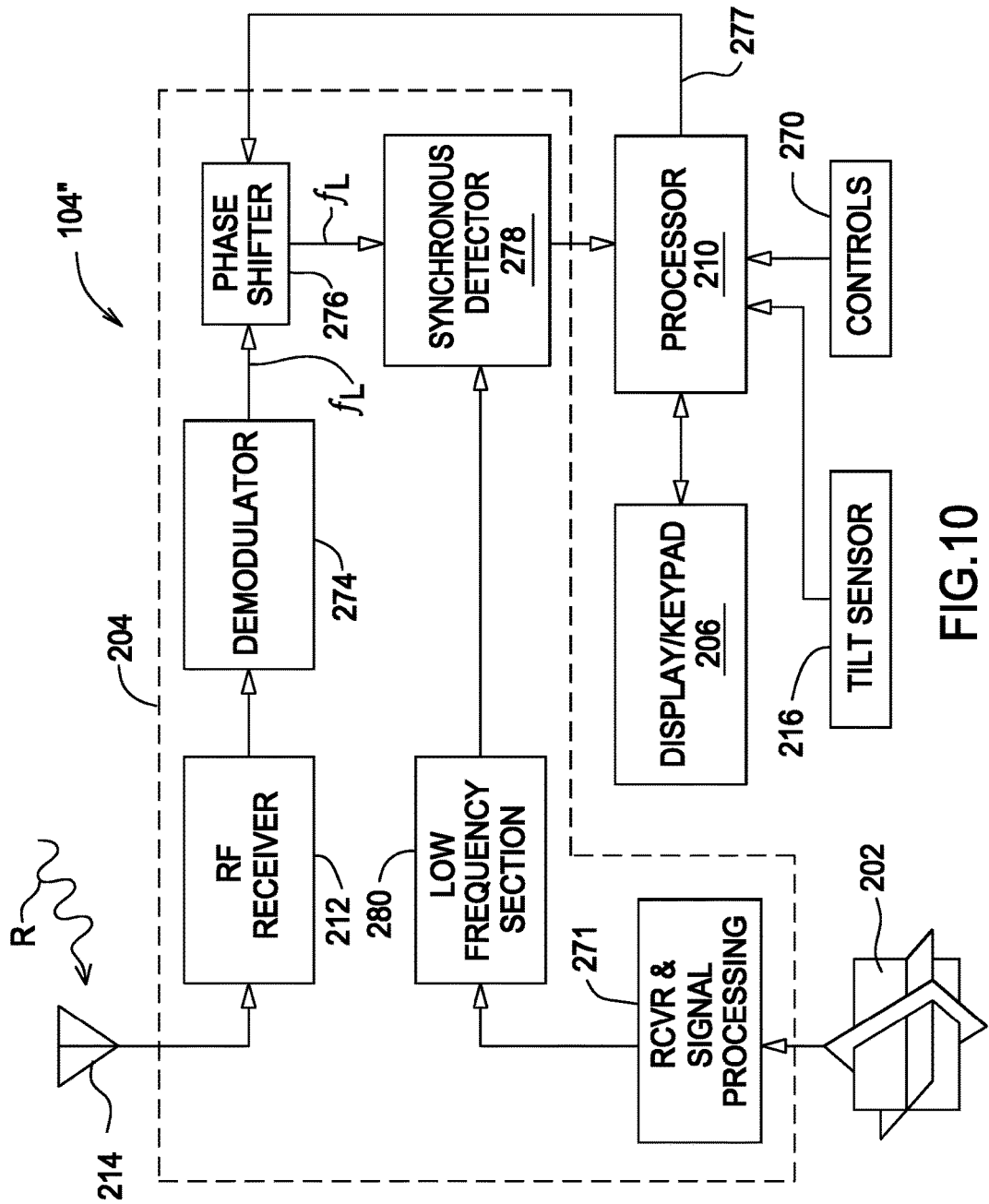
FIG. 10 is a block diagram which illustrates another embodiment of a receiver/locator of the present invention which is configured for receiving a reference signal modulated on an RF carrier.

Turning now to FIG. 10, another embodiment of a receiver, produced in accordance with the present invention, is generally indicated by the reference number 104". In this regard, it is noted initially that receiver 104" is configured for use with a transmitter, such as transmitter 102" of FIG. 9, having provisions for transmitting reference signal R above ground using an RF carrier so as to extend the transmission range to a distance that can be longer than the useful transmission range of the locating signal transmitted through the ground. Since receiver 104" includes a number of components that are used in receiver 104 of FIG. 7, descriptions of these components will not be repeated for purposes of brevity. Receiver 104", however, includes telemetry arrangement 212 in the form of an RF receiver that is connected to RF antenna 214 (see also FIG. 5) for receiving reference signal R. RF receiver 212 is, in turn, connected to demodulator 274. Having recovered reference signal R, receiver 104" operates in essentially the same manner as receiver 104 of FIG. 7.

Figure 11:
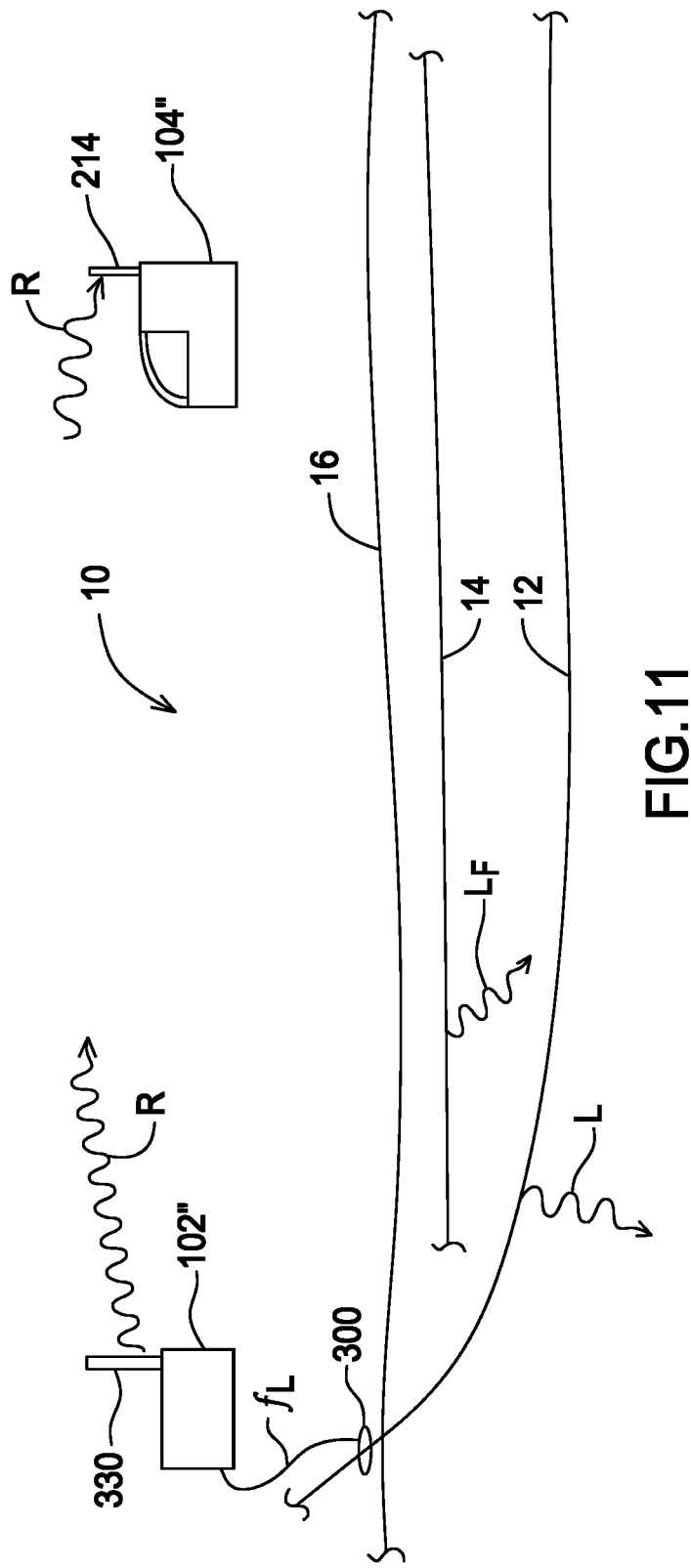
FIG. 11 is a diagrammatic view, in elevation, of a region in which the transmitter of FIG. 9 and the receiver of FIG. 10 are in use, shown here to illustrate further details with respect to their operation.

Referring to FIGS. 9-11, the latter figure illustrates the use of transmitter 102" of FIG. 9 and receiver 104" of FIG. 10 in region 10. In particular, transmitter 102" is used to induce the locating signal frequency onto cable 12 while transmitting reference signal R through the air for reception by receiver 104'.

Although each of the aforedescribed physical embodiments have been illustrated with various components having particular respective orientations, it should be understood that the present invention may take on a variety of specific configurations with the various components being located in a wide variety of positions and mutual orientations. Furthermore, the methods described herein may be modified in an unlimited number of ways, for example, by reordering, modifying and recombining the various steps. Accordingly, it should be apparent that the arrangements and associated methods disclosed herein may be provided in a variety of different configurations and modified in an unlimited number of different ways, and that the present invention may be embodied in many other specific forms without departing from the spirit or scope of the invention. Therefore, the present examples and methods are to be considered as illustrative and not restrictive, and the invention is not to be limited to the details given herein.

What is claimed is:

1. A transmitter as part of a cable locating system for use in a region which contains at least first and second in-ground cables, each of which cables includes an electrically conductive component such that, when the first cable is driven at a locating signal frequency to emit a locating signal in an electromagnetic form, the locating signal is coupled to the second cable in a way which causes the second cable to generate a false locating signal in electromagnetic form, said transmitter comprising:

a frequency generator for generating said locating signal frequency for coupling onto the first cable and a reference signal, which includes said locating signal frequency modulated thereon such that the reference signal includes a modulation envelope for distinguishing the locating signal from the false locating signal;

a switch selectively coupling the locating signal frequency to the first cable in each one of a plurality of selectable coupling configurations such that the locating signal is subject to a coupling phase shift that varies based on the selected coupling configuration; and a phase shifter for phase shifting the locating signal frequency responsive to the selected coupling configuration such that the locating signal frequency at least approximately matches the phase of the locating signal at least to compensate for the coupling phase shift.

2. The transmitter of claim 1 wherein the switch outputs a selection signal to the phase shifter that is indicative of the selected coupling configuration.

3. The transmitter of claim 2 wherein the plurality of selectable coupling configurations includes inductive coupling, antenna coupling and direct electrical coupling.

4. The transmitter of claim 1 wherein said locating signal frequency, as modulated on the reference signal, is at least approximately in a fixed phase relationship with said locating signal for distinguishing between the locating signal and the false locating signal based, at least in part, on said fixed phase relationship.

5. The transmitter of claim 4 wherein said locating signal is driven onto the first cable using inductive coupling and wherein said fixed phase relationship is at least approximately 90 degrees.

6. The transmitter of claim 4 wherein said fixed phase relationship is of a known magnitude and phase angle in relationship to said locating signal frequency.

7. The transmitter of claim 4 configured for driving the locating signal onto said first cable in a given way which establishes the fixed phase relationship.

8. The transmitter of claim 1 wherein the reference signal includes a carrier frequency that is modulated by said locating signal frequency.

9. The transmitter of claim 8 wherein the carrier frequency is higher than the locating signal frequency.

10. The transmitter of claim 8 wherein the carrier frequency is amplitude modulated by the locating signal frequency such that the reference signal is amplitude modulated.

11. The system of claim 10 wherein said modulation envelope of the reference signal corresponds to the locating signal frequency.

* * * * *